United States Patent [19]

Milne

[11] 4,046,168
[45] Sept. 6, 1977

[54] CLOSURE PLUGS

[75] Inventor: John D. Milne, Islington, Canada

[73] Assignee: MM Plastic (Mfg) Company, Inc., Toronto, Canada

[21] Appl. No.: 681,044

[22] Filed: Apr. 28, 1976

Related U.S. Application Data

[63] Continuation of Ser. No. 539,334, Jan. 8, 1975, abandoned.

[30] Foreign Application Priority Data

Sept. 30, 1974 Canada .................................. 210412

[51] Int. Cl.$^2$ ...................... F16L 55/10; B65D 59/02; B65D 39/04
[52] U.S. Cl. .................................. 138/89; 138/96 R; 217/110; 220/284; 220/306
[58] Field of Search ............... 138/89, 96 R; 220/281, 220/284, 306, 352; 217/110

[56] References Cited

U.S. PATENT DOCUMENTS

| 815,954 | 3/1906 | Gilbert | 138/96 R |
|---|---|---|---|
| 2,663,451 | 12/1953 | Yarnall | 220/284 |
| 3,148,798 | 9/1964 | Brown | 138/89 |
| 3,358,869 | 12/1967 | Palmer et al. | 138/89 |
| 3,807,457 | 4/1974 | Logsdon | 138/89 |

FOREIGN PATENT DOCUMENTS

| 1,475,604 | 10/1969 | Germany | 138/89 |
|---|---|---|---|
| 185,345 | 9/1922 | United Kingdom | 217/110 |

Primary Examiner—Richard E. Aegerter
Assistant Examiner—Richard R. Stearns
Attorney, Agent, or Firm—Ridout & Maybee

[57] ABSTRACT

In order to avoid the necessity of having a range of sizes of tools for the mounting and removal of a plurality of resiliently deformable plugs of different transverse dimensions on the ends of associated tubes, there is provided a plurality of such plugs which can all be mounted on, or removed from, the ends of the associated tubes using the same tool. In the plugs, each of which comprises a circular disc portion, an annular skirt portion projecting from the periphery of the disc portion to one side thereof, and a pin member which projects in the direction of the longitudinal axis of the plug from the center of the disc portion to said one side thereof, with the skirt portion presenting an outwardly directed annular closure member having an outer diameter which is reducible by resilient deflection of the disc portion to either side thereof, the transverse cross-sectional dimensions of the pin members of the plugs are the same. Furthermore, the pin member of each plug is circular in transverse cross-section thereby to facilitate, during the mounting or removal of the plug, applying a force which results in the resilient deflection of the disc portion of the plug being substantially symmetrical about the center of the disc portion so that the reduction in the outer diameter of the annular closure member during this operation is substantially uniform.

1 Claim, 5 Drawing Figures

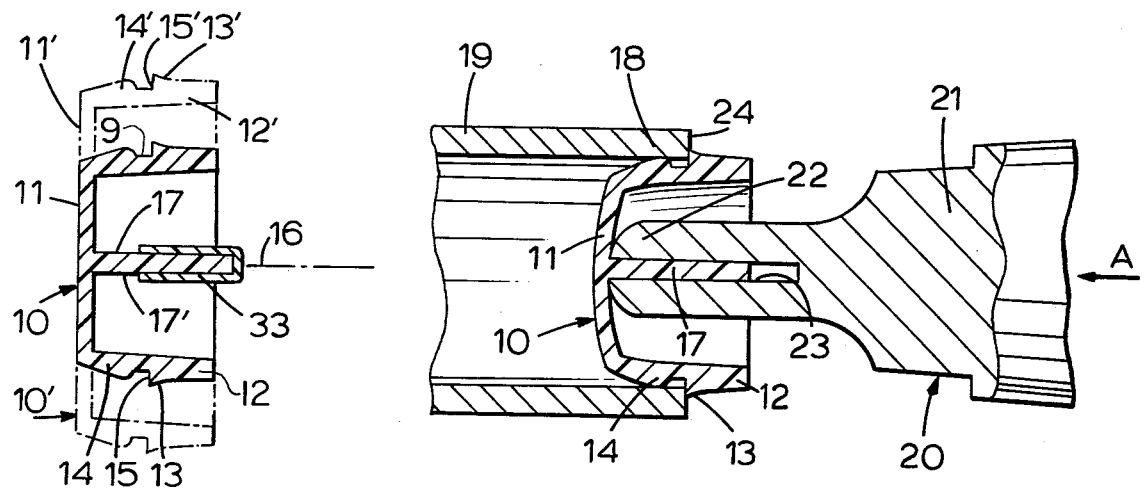
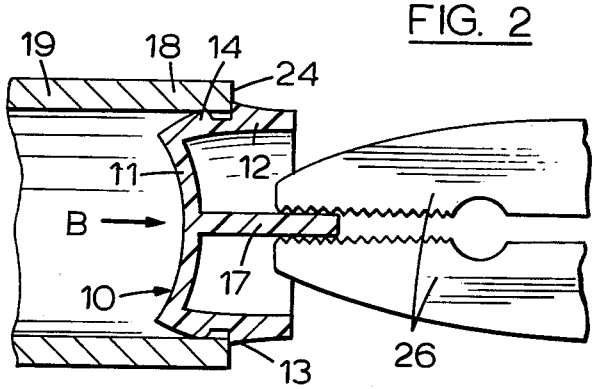
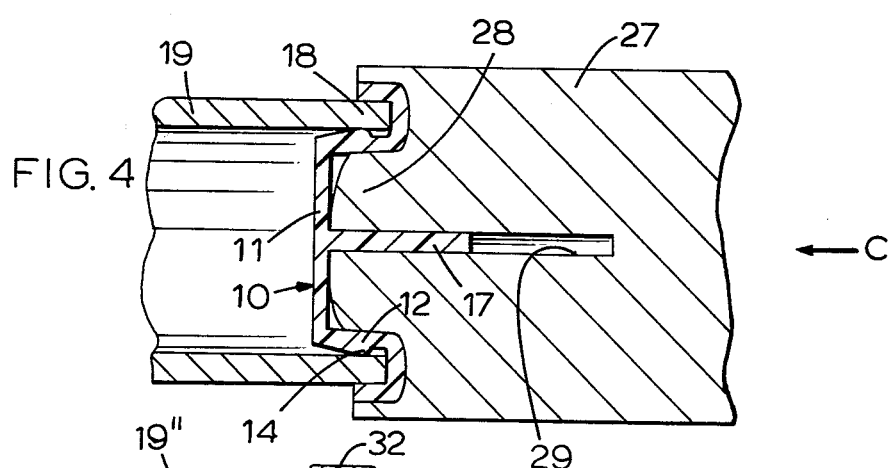
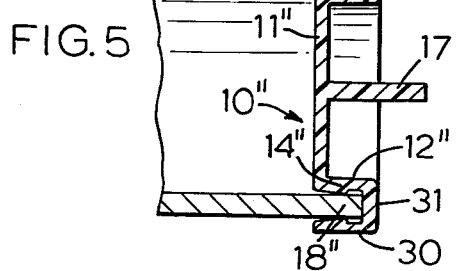

CLOSURE PLUGS

This is a continuation of application Ser. No. 539,334 (now abandoned), filed Jan. 8, 1975.

This invention is concerned with plugs for closing the ends of tubes. Such plugs are conventionally used substantially to prevent the inadvertent entry of foreign matter, such as for example dirt or moisture, into the tubes both in the tube manufacturing plant and during the installation of the tubes in, for example, a building structure, the plugs being removed immediately prior to the installation of, for example, electrical cables through the tubes and the final connection of the tubes, or immediately prior to the final connection of the tubes for the operative passage therethrough of, for example, water, as the case may be.

It has hitherto been known to provide such plugs each of which consists of a circular disc portion and an annular skirt portion projecting from the periphery of the disc portion to one side thereof. While such plugs as hitherto known function reasonably satisfactorily in operatively preventing the inadvertent entry of, for example, dirt or moisture into the associated tubes, they suffer from the disadvantage that difficulties can be encountered, if the plugs are to provide an effective closure of the ends of associated tubes, in mounting the plugs in, and withdrawing the plugs from, the ends of the tubes.

With the view of overcoming this disadvantage it has hitherto been proposed to provide such a plug which is of resiliently deformable material and the skirt portion of which presents an outwardly directed annular closure member, the closure member having an outer diameter which could be reduced by resilient deflection of the disc portion to either side thereof. In this connection reference is made to U.S. Pat. No. 2,663,451 which issued on Dec. 22, 1953 to Chandler P. Yarnall. Thus, by resilient deflection of the disc portion of the plug to one side thereof the outer diameter of the annular closure member can be reduced thereby facilitating the mounting of the plug in the end of the associated tube, the outer diameter of the annular closure member tending to return to its original value with resultant secure engagement of the annular closure member with the inner face of the tube when the disc portion is permitted to return towards its original condition. Correspondingly, by resilient deflection of the disc portion of the plug to said one side thereof or to the other side thereof the outer diameter of the annular closure member can again be reduced to facilitate removal of the plug from the end of the associated tube.

It is generally desirable for the above-described reduction in the outer diameter of the annular closure member to be substantially uniform around the closure member, and hence for the deflection of the disc portion of the plug to be symmetrical about the center thereof. In, for example, the above-number United States patent to Yarnall there is provided a pull tab which may serve operatively to cause resilient deflection of the disc portion of the plug disclosed therein, but this pull tab will not cause deflection of the disc portion symmetrically about the center thereof, and it is accordingly an object of the present invention to provide a plug in which this disadvantage is substantially obviated or mitigated.

According to the present invention there is provided a resiliently deformable plug for closing an end of a tube, the plug comprising: a deformable circular disc portion; a deformable annular skirt portion of circular cross-section which projects from the periphery of the disc portion to one side thereof and substantially normal to the normal plane of the disc portion, the skirt portion presenting an outwardly directed annular closure member having an outer diameter which is reducible by resilient deflection of the disc portion to either side thereof; and a pin member which is integral with said disc portion and projects in the direction of the longitudinal axis of the plug from the center of the disc portion to said one side thereof, the pin member being circular in transverse cross-section throughout its entire length, the outer wall of said pin member being spaced from the inner surface of said annular skirt portion and concentric therewith with the portion of the circular disc portion disposed between the inner surface of the annular skirt portion and the outer surface of the circular base of the pin member comprising a flexible annulus of uniform width, the skirt portion having a terminal edge and said annular closure member comprising an outwardly projecting, annular sealing member of bulbous form as viewed in transverse cross-section disposed intermediate said circular disc portion and said terminal edge, an outwardly directed annular rim member projecting from the periphery of said annular skirt portion between said annular closure member and said terminal edge, said rim member having an annular abutment face extending normal to the axis of the plug and directed toward said disc portion, said annular skirt portion being formed with an annular groove between said annular abutment face and said annular closure member, at least one wall of said groove extending normal to the axis of said plug and being coextensive with said abutment face of the annular rim member, and axial movement of said pin member from its normal position resiliently deflecting said disc portion substantially symmetrically about the center thereof and substantially uniformly reducing the outer diameter of said annular skirt portion and the outwardly directed annular closure member.

In order that the invention may be more clearly understood and more readily carried into effect the same will now, by way of example, be more fully described with reference to the accompanying drawings in which FIG. 1 is an axially sectioned view showing two plugs according to a preferred embodiment of the invention, one of these plugs being shown in full lines and the other of these plugs being shown partially in chain-dotted lines;

FIG. 2 is an axially sectioned view showing the plug illustrated in full lines in FIG. 1 being mounted on an end of a tube;

FIG. 3 is a view corresponding to FIG. 2 but showing the plug illustrated therein being removed from the end of the tube;

FIG. 4 is a view corresponding to FIG. 2 showing a further operation which may be performed in the mounting of the plug on the end of the tube; and FIG. 5 is an axially sectioned view showing a plug according to an alternative embodiment of the invention mounted on an end of a tube.

Referring to the drawings and in particular to FIG. 1 thereof, 10 denotes generally a plug according to a perferred embodiment of the invention, for closing an end of a tube. The plug 10 is integrally formed of a resiliently deformable material, such as a vinyl material, and comprises a circular disc portion 11 and an annular skirt portion 12 which projects from the periphery of the disc portion 11 to one side thereof. The skirt portion 12 present an outwardly directed annular rim member 13 together with an outwardly directed annular closure member 14 which is disposed between the rim member 13 and the disc portion 11, the rim member 13 having an annular abutment face 15 which is directed towards the disc portion 11 and which is in a plane substantially at right angles to the longitudinal axis 16 of the plug 10. The closure member 14 is of bulbous form in transverse cross-section as is clearly shown in FIG. 1. Also, as shown, an annular groove 9 is formed in the annular skirt portion with one wall of the groove being coextensive with the face 15 of the rim member 13.

The plug 10 also comprises a pin member 17 which projects, in the direction of the longitudinal axis 16 of the plug 10, from the center of the disc portion 11 to the same side thereof as the skirt portion 12, the pin member 17 being circular in transverse cross-section. The portion of the circular disc portion 11 disposed between the inner surface of the annular skirt portion 12 and the outer surface of the circular base of the pin member 17 comprises a flexible annulus of uniform width.

FIG. 1 also shows a second plug 10' which, as will be appreciated, is illustrated superimposed on the plug 10, with those portions of the plug 10' which do not coincide with the corresponding portions of the plug 10 being illustrated in chain-dotted lines. Thus, it will be noted that the plug 10' is substantially identical to the plug 10 but is of different, and more particularly greater, transverse dimensions, except that the transverse cross-sectional dimensions of the pin member 17' of the plug 10' are the same as the corresponding transverse cross-sectional dimensions of the pin member 17 of the plug 10. In FIG. 1 the portions of the plug 10' corresponding to the portions of the plug 10 are denoted by the same reference numerals to which a prime mark has been added.

Although in FIG. 1 only two plugs 10 and 10' are shown it will be appreciated that there may be provided more than two such plugs which are of different transverse dimensions, with however the transverse cross-sectional dimensions of the pin members of the plugs being the same.

Referring now to FIG. 2 which shows the manner of mounting the plug 10 on an end 18 of a tube 19 for closing said end 18, 20 denotes generally an apparatus comprising a shank 21 only a portion of which is shown and which has an end portion 22 provided with a bore 23 of circular transverse cross-section. The pin member 17 is a snug fit within the bore 23, and as is indicated in FIG. 2 the plug 10 is mounted on the end 18 of the tube 19 by disposing the plug 10 on the end portion 22 of the shank 21 with the pin member 17 within the bore 23 and then urging the shank 21 in the direction of the arrow A, thereby to urge the disc portion 11 and the skirt portion 12 into the tube 19 until the abutment face 15 of the rim member 13 enters into abutting contact with the end face 24 presented by the end 18 of the tube 19, this being the specific condition shown in FIG. 2. During this urging of the disc portion 11 and the skirt portion 12 into the tube 19 the disc portion 11 is resiliently deflected to one side thereof as is clearly shown in FIG. 2, this resilient deflection of the disc portion 11 causing a reduction in the outer diameter of the closure member 14 thereby to facilitate the mounting of the plug 10 on the end 18 of the tube 19. When the plug 10 attains the condition shown in FIG. 2 in which the abutment face 15 of the rim member 13 is in abutting contact with the end face 24 of the tube 19 the appartus 20 is withdrawn thereby permitting the disc portion 11 to return towards its initial condition with a resultant tendency for the outer diameter of the closure member 14 to return to its initial value so that the closure member 14 thus enters into secure contact with the inner face 25 of the tube 19.

When it is subsequently desired to remove the plug 10 from the end 18 of the tube 19 a force is applied to the pin member 17 in the direction of the arrow B shown in FIG. 3. This force may be applied to the pin member 17 by any suitable apparatus. Thus, for example, this apparatus may be constituted by a pair of pliers which may be of conventional form and between the jaws 26 of which the pin member 17 is securely gripped as shown in FIG. 3.

The force applied to the pin member 17 in the direction of the arrow B causes resilient deflection of the disc portion 11 as is clearly shown in FIG. 3. Although this resilient deflection of the disc portion 11 is to the opposite side thereof from that shown in FIG. 2 this resilient deflection again results in a reduction in the outer diameter of the closure member 14 thereby facilitating removal of the plug 10 from the end 18 of the tube 19.

Since the pin member 17 projects, in the direction of the longitudinal axis 16 of the plug 10, from the center of the disc portion 11 and since this pin member 17 is circular in transverse cross-section, the above-described resilient deflection of the disc portion 11, both during the mounting of the plug 10 on the end 18 of the tube 19 as hereinbefore described with reference to FIG. 2 and during the removal of the plug 10 from the end 18 of the tube 19 as hereinbefore described with reference to FIG. 3, is substantially symmetrical about the centre of the disc portion 11 so that the resultant reduction in the outer diameter of the closure member 14 during these operations is substantially uniform around the closure member 14, as is generally desirable.

FIG. 4 illustrates a further operation which may, if desired, be performed in the mounting of the plug 10 on the end 18 of the tube 19 after the operation hereinbefore described with reference to FIG. 2 has been completed. Referring to FIG. 4, 27 denotes an apparatus having an end portion 28 in which a bore 29 of circular form in transverse cross-section is provided, the apparatus 27 operatively being located with the pin member 17 of the plug 10 is disposed as a snug fit within this bore 28. The apparatus 27 is then urged in the direction of the arrow C, the configuration of the end portion 28 of the apparatus 27 being such that the end portion of the skirt portion 12 of the plug 10 remote from the disc portion 11 is thereby reflexly disposed over the end face 24 of the tube 19. Where the plug 10 is formed of a thermoplastic material, the end portion 28 of the apparatus 27 is operatively heated thereby to soften said end portion of the skirt portion 12 of the plug 10 to facilitate the reflex disposition thereover over the end face 24 of the tube 19.

Referring to FIG. 5, except as hereinafter described the plug 10" illustrated therein corresponds to the plug 10 as hereinbefore described with reference to FIGS. 1 to 3, inclusive, and accordingly corresponding reference numerals with the addition of double prime marks are used to denote corresponding parts. The plug 10" shown in FIG. 5 differs from the plug 10 hereinbefore described with reference to FIGS. 1 to 3, inclusive, in that the end portion of the skirt portion 12" of the plug 10" remote from the disc portion 11" is reflexly disposed thereby to provide an outer annular skirt portion 30 and an annular end portion 31 which interconnects the skirt portion 30 and the remainder of the skirt portion 12″ at the end of said remainder of the skirt portion 12″ remote from the disc portion 11‴, this end portion 31 being substituted for the rim member 13, and the skirt portion 30 which of course surrounds said remainder of the skirt portion 12″ in spaced relationship thereto presenting an inwardly directed annular closure member 32 which corresponds generally in form to the closure member 14″ and which operatively enters into substantially secure contact with the outer face of the tube 19‴. Thus, except for the provision of the closure member 32, it will be noted that the form of the plug 10″ shown in FIG. 5 substantially corresponds to the form of the plug 10 shown in FIG. 4, although of course whereas the plug 10 shown in FIG. 4 is formed into the configuration shown therein during the mounting of the plug 10 on the end 18 of the tube 19 the plug 10″ shown in FIG. 5 is initially manufactured in the configuration shown therein, this plug 10″ shown in FIG. 5 being mounted on and removed from the end 18″ of the tube 19 in a manner corresponding to that hereinbefore described with reference to FIGS. 2 and 3, respectively.

As shown in FIG. 1, a sleeve 33 may be mounted on the pin member 17, this sleeve 33 being of a different colour than the plug 10. Such a sleeve 33 may be used to identify the appropriate tube 19 or may be used, for example, to facilitate stocktaking. Thus, where a plurality of the tubes are stored in bundles all containing the same nuber of tubes a sleeve 33 may be mounted on the pin member 17 of the plug 10 mounted on an end of one of the tubes in each bundle, so that for stocktaking it is merely necessary to count the number of sleeves 33 and multiply the result by the number of tubes in each bundle in order to determine the total number of tubes.

It will be noted from, for example, FIG. 2 that the rim member 13 has an outer diameter which is less than the outer diameter of the tube 19, thereby permitting the tube 19 after the plug 10 has been mounted on the end 18 thereof to be passed through, for example, a tube straightening machine or a machine which applies identification marking to the outer face of the tube 19 in the tube manufacturing plant, without these operations, which it is frequently necessary to perform on tubes, being in any way hindered or prevented by the presence of a rim member on the plug which has an outer diameter greater than the outer diameter of the tube and which therefore projects beyond the outer face of the tube. It will of course be appreciated that this advantage is not achieved if the further operation hereinbefore described with reference to FIG. 4 has been performed or if the plug 10 is of the form hereinbefore described with reference to FIG. 5, but in certain cases it may be acceptable to forfeit this advantage in order to ensure improved sealing of the plug 10 on the end 18 of the tube 19 which it is the purpose of the further operation hereinbefore described with reference to FIG. 4 to achieve and which it is a purpose of the embodiment hereinbefore described with reference to FIG. 5 to achieve.

Since, as hereinbefore described with reference to FIG. 1, the transverse cross-sectional dimensions of the pin members 17 and 17′ of the plurality of plugs 10 and 10′ of different transverse cross-section dimensions are the same this permits the same apparatus 20 to be used for mounting the plugs 10 and 10′ on the ends of the appropriate tubes in the manner hereinbefore described with reference to FIG. 2, and the same apparatus to be used for removing the plugs 10 and 10′ from the ends of the the tubes in the manner hereinbefore described with reference to FIG. 3, so that it is not necessary for such apparatus of different dimensions to be provided for the various plugs 10 and 10′ of different transverse cross-sectional dimensions.

What I claim as my invention is:

1. A resiliently deformable plug for closing an end of a tube, the plug comprising: a deformable circular disc portion; a deformable annular skirt portion of circular cross-section which projects from the periphery of the disc portion to one side thereof and substantially normal to the normal plane of the disc portion, the skirt portion presenting an outwardly directed annular closure member having an outer diameter which is reducible by resilient deflection of the disc portion to either side thereof; and a pin member which is integral with said disc portion and projects in the direction of the longitudinal axis of the plug from the center of the disc portion to said one side thereof, the pin member being circular in transverse cross-section throughout its entire length, the outer wall of said pin member being spaced from the inner surface of said annular skirt portion and concentric therewith with the portion of the circular disc portion disposed between the inner surface of the annular skirt portion and the outer surface of the circular base of the pin member comprising a flexible annulus of uniform width, the skirt portion having a terminal edge and said annular closure member comprising an outwardly projecting, annular sealing member of bulbous form as viewed in transverse cross-section disposed intermediate said circular disc portion and said terminal edge, an outwardly directed annular rim member projecting from the periphery of said annular skirt portion between said annular closure member and said terminal edge, said rim member having an annular abutment face extending normal to the axis of the plug and directed toward said disc portion, said annular skirt portion being formed with an annular groove between said annular abutment face and said annular closure member, at least one wall of said groove extending normal to the axis of said plug and being coextensive with said abutment face of the annular rim member, and axial movement of said pin member from its normal position resiliently deflecting said disc portion substantially symetrically about the center thereof and substantially uniformly reducing the outer diameter of said annular skirt portion and the outwardly directed annular closure member.

* * * * *